(12) United States Patent
Andringa et al.

(10) Patent No.: US 9,996,880 B2
(45) Date of Patent: Jun. 12, 2018

(54) METHOD AND SYSTEM FOR PREVENTING AND DETECTING IDENTITY THEFT

(75) Inventors: Mark Andringa, Vienna, VA (US);
Lisa Glau, Alexandria, VA (US);
Jonathan Slaton, Marshall, VA (US)

(73) Assignee: Intersections, Inc., Chantilly, VA (US)

( * ) Notice: Subject to any disclaimer, the term of this patent is extended or adjusted under 35 U.S.C. 154(b) by 1154 days.

(21) Appl. No.: 11/711,836

(22) Filed: Feb. 28, 2007

(65) Prior Publication Data
US 2007/0244807 A1 Oct. 18, 2007

Related U.S. Application Data

(60) Provisional application No. 60/777,150, filed on Feb. 28, 2006.

(51) Int. Cl.
*G06Q 40/00* (2012.01)
*G06Q 40/08* (2012.01)
*G06Q 40/02* (2012.01)

(52) U.S. Cl.
CPC ............. *G06Q 40/08* (2013.01); *G06Q 40/00* (2013.01); *G06Q 40/025* (2013.01)

(58) Field of Classification Search
CPC .................................................... G06Q 40/00
USPC .................................................... 705/35, 38
See application file for complete search history.

(56) References Cited

U.S. PATENT DOCUMENTS

| 6,311,169 B2 * | 10/2001 | Duhon ........................... 705/38 |
| 7,686,214 B1 * | 3/2010 | Shao .................... G06Q 20/382 235/380 |
| 2003/0225729 A1 * | 12/2003 | Maloche ........... G06F 17/30867 |
| 2006/0271457 A1 * | 11/2006 | Romain ................. G06Q 40/00 705/35 |

OTHER PUBLICATIONS

Julia S. Cheney, Identity Theft: Do Definitions Still Matter?, Aug. 2005, Federal Reserve Bank of Philadelphia, web edition, 2-18 (Year: 2005).*

* cited by examiner

*Primary Examiner* — I Jung Liu
(74) *Attorney, Agent, or Firm* — Banner & Witcoff, Ltd.

(57) ABSTRACT

A system, method and computer program product for receiving information relating to a financial account of an individual from at least one first data provider; receiving information relating to at least one of an identity theft expense reimbursement insurance policy of the individual, a public information relating to the individual, an identity theft risk score of the individual, a credit card registry of the individual, a backup data relating to the individual, a background information of the individual, and a business report relating to the individual, from at least one second data provider; and preparing a report relating to the individual's identity theft based on the information.

15 Claims, 3 Drawing Sheets

METHOD AND SYSTEM FOR PREVENTING AND DETECTING IDENTITY THEFT

CROSS-REFERENCE TO RELATED MATERIAL

This application is related to, claims the benefit of under 35 U.S.C. Section 119(e), and is a non-provisional of U.S. Patent Application Ser. No. 60/777,150, entitled, "Method and System for Preventing and Detecting Identity Theft", to ANDRINGA et al., filed Feb. 28, 2006, of common assignee to the present invention, the contents of which are incorporated herein by reference in their entireties.

FIELD OF INVENTION

The invention relates generally to privacy protection, and in particular to prevention and detection of identify theft.

BACKGROUND OF THE INVENTION

Today's modern economy demands access to personal identifying information in order to provide such services as health insurance, loans, jobs and even cell phone service. Unfortunately, mining that information can also be an illegal, but often low-risk goal for thieves. A recent study by Gartner, Inc. found that the identity thieves' risk of being caught is only 1 in 700. Identity theft is one of the fastest growing crimes in North America. Identity thieves can rob consumers of money, time, affordable credit, even their reputation and the consumer may not even realize it.

Under reported for years, the Federal Trade Commission (FTC) now says that as many as one in every eight American adults and one in every four households has been victimized by identity thieves in the past five years. Reports indicate that there have been over nine million new victims of identity theft per year for two years running, with over 36 million new victims of identity theft in the past five years. Ten million Americans in the past year alone have fallen victim to this destructive crime. At the current rate of growth in identity theft, approximately 20 percent of active U.S. consumers of credit will be victims of identity theft by 2007. Identity theft has been the top consumer complaint to the FTC for five years in a row.

While the rise of technology has been partly blamed for an increase in identity theft and fraud, many of the ways of identity thieves obtain personal information remain decidedly low-tech. In fact, the FTC estimates that 400,000 individuals have had their mail stolen and subsequently became the victims of identity theft just last year, ABC reported in February, 2004.

The costs of identity theft to individuals and businesses are astronomical and rising. The FTC reports that direct out-of-pocket losses to consumers of five billion dollars during the last year alone and says businesses and financial institutions lost a staggering 48 billion during the same time period. Additionally, the repercussions of identity theft go far beyond the wallet for many individuals and businesses. Americans now spend almost three million hours resolving problems related to identity theft each year. Many victims report ongoing problems beyond direct financial loss, including loan or insurance rejection, failure of pre-employment screening, criminal investigation or harassment by creditors, as a result of the fraud.

Identity theft is very difficult to prevent due to the myriad number of ways that identity thieves can access a consumer's private information. Private information can be accessed by stealing an individual's mail, wallet, etc. Additionally, online schemes are becoming much more prevalent. Phishing, pharming and tacking have become commonplace in the online world. Moreover, there have been numerous security breaches at large corporations, and not just data brokers and banks. Data on approximately 13.5 million consumers has been publicly reported by businesses, hospitals, universities and other organizations as lost or stolen in the first half of 2005. Additionally, a recent survey of 163 companies found that 75% of these companies reported that a serious security breach had occurred within the past twelve-month period.

Although the loss of personal information is concerning, the critical damage occurs when that theft of personal information is used to defraud. Identity fraud is a multi-faceted and evolving problem. It may surface as internet fraud, synthetic ID fraud, credit card and mortgage application fraud, non-credit card transactional fraud, and many others. The creation of new accounts and the takeover of existing accounts are among the most damaging methods used by identity thieves.

A large amount of information needs to be aggregated from disparate sources and then analyzed in order for an individual to prevent and/or detect the theft of their identity. Accordingly, there is need for a system and method to assist individuals in preventing or detecting identity theft.

SUMMARY OF THE INVENTION

Embodiments of the invention provide a system, method, and computer program product for preventing and/or detecting identity theft. Multiple layers of protection may be provided to prevent and/or detect potential identity theft. Identifying signs of identity theft early can help prevent thieves from committing fraud in an individual's name. A set of screening tools may be provided to help monitor an individual's personal profile and stop fraud in its tracks. With continuous electronic monitoring of an individual's personal information, prompt alerts may be sent when changes that may indicate an individual's identity has been compromised. The individual may then determine what actions to take in order to recover their identity quickly and minimize their financial loss.

A method according to an exemplary embodiment of the invention includes receiving first information relating to a financial account of an individual from at least one first data provider; receiving second information relating to at least one of an identity theft expense reimbursement insurance policy of the individual, a public information relating to the individual, an identity theft risk score of the individual, a credit card registry of the individual, a backup data relating to the individual, a background information of the individual, and a business report relating to the individual, from at least one second data provider; and preparing a report relating to the individual's identity theft based on the first and second information.

In the exemplary embodiment, the first information may be related to a financial account of the individual, a financial account monitoring of the individual, a brokerage account of the individual, or a monitoring of a credit card of the individual. Also, in the exemplary embodiment, where the second information is related to a public information of the individual, the second data provider may include a public record report provider, a public record monitoring and/or notification, or an internet monitoring & notification.

In a further exemplary embodiment, the method may further include receiving third information relating to the individual's credit from at least one third data provider, where the preparing of the report is based the first and second information, the first and third information, or the second and third information. In a yet further embodiment, the third information may be related to a credit report of the individual, a credit score of the individual, a credit monitoring of the individual, or a credit update of the individual.

A system according to an exemplary embodiment of the invention includes at least one first data provider, which may comprise a DDA (Direct Deposit Account) credit report, a DDA credit monitoring & notification, a brokerage account monitoring & notification, or a credit card transaction activity monitoring & notification; at least one second data provider, which may comprise an identity theft expense reimbursement insurance provider, a public record report provider, a public record monitoring & notification provider, an internet monitoring and/or notification provider, an identity theft risk score provider, a credit card registry, a data backup provider, a background screening provider, or a business report provider; and an identity theft engine which may receive information from the first and second data providers and create a report relating to an individual's identity theft. In a further embodiment, the system may further include a third data provider, which may comprise a credit report provider, a credit score provider, a credit monitoring provider, or a credit update provider.

A software program product according to an exemplary embodiment of the invention may perform a method that includes receiving first information relating to a financial account of an individual from at least one first data provider; receiving second information relating to at least one of an identity theft expense reimbursement insurance policy of the individual, a public information relating to the individual, an identity theft risk score of the individual, a credit card registry of the individual, a backup data relating to the individual, a background information of the individual, and a business report relating to the individual, from at least one second data provider; and preparing a report relating to the individual's identity theft based on the first and second information. In a further embodiment, the method may further include receiving third information relating to the individual's credit from at least one third data provider, where the preparing of the report is based the first and second information, the first and third information, or the second and third information. In a yet further embodiment, the third information may be related to a credit report of the individual, a credit score of the individual, a credit monitoring of the individual, or a credit update of the individual.

BRIEF DESCRIPTION OF THE DRAWINGS

The foregoing and other features and advantages of the invention will be apparent from the following, more particular description of a preferred embodiment of the invention, as illustrated in the accompanying drawings, in which.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

Vast amounts of personal information regarding individuals are now collected and stored by companies, governments, etc. The personal information is typically obtained by independent entities and stored at disparate locations. As such, individuals do not currently have means by which to easily view the collective information gathered regarding themselves. When viewed separately, this information may be of limited value to the individual in preventing or detecting identity theft. However, when the information is viewed collectively by the individual, a different picture may emerge. Viewing the collective information may provide the individual insight into their risk of identity theft or help in early detection of an identity theft that has, unfortunately, already occurred.

Embodiments of the present invention provide a unified view and tool for collecting, viewing and analyzing personal information. Data may be imported from many different independent sources into a common correlated data set. The data set may be stored in a database. A user interface that allows an individual to view the data may also be provided.

Embodiments of the present invention may also include a system that provides and collects information through a distributed computer network. A central datastore integrates information regarding the risk of identity theft. The central datastore may be derived from a variety of data sources and may provide information to multiple system users, such as a theft engine or individual users. The central datastore may also be enhanced to dynamically interact with other information servers (e.g., through client-server database standards, middleware, or multi-tier architecture).

Figure 1:
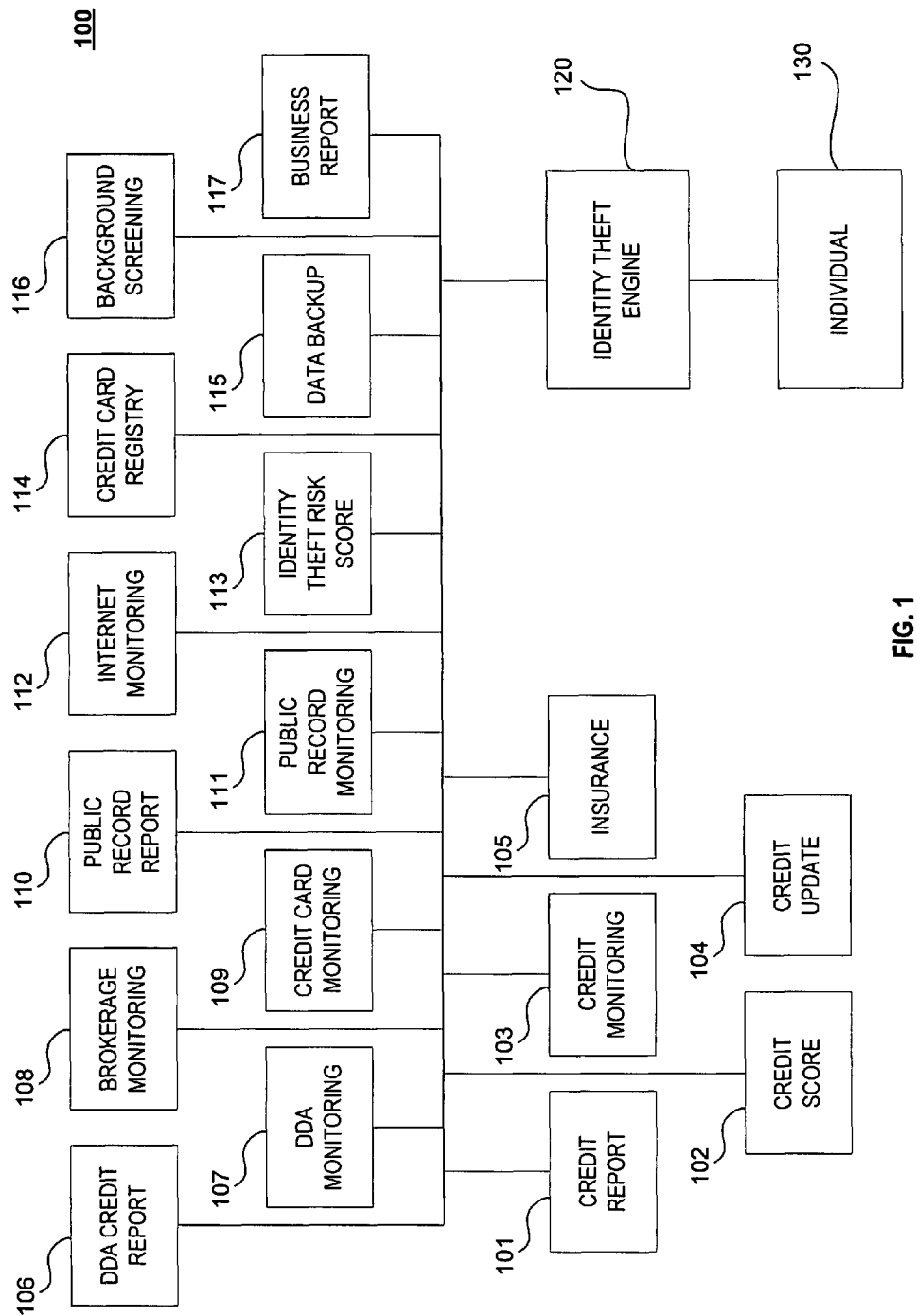
FIG. 1 depicts an example of a system according to an exemplary embodiment of the present invention.

Turning now to FIG. 1, a system 100 including a number of different data providers is shown. The data providers provide information and may include databases, data aggregators, and the like. The data providers may also provide items instead of or in addition to data, such as services, etc. The data providers may provide different types of data and/or may be independent from each other. Some of the data providers may provide the same information, but still be independent from each other. For example, the three credit bureaus, Equifax®, Experian® and TransUnion℠, each provide credit information, but are independent from each other. Examples of data providers that may be included in the disclosed embodiment of the invention are discussed below.

Data provider 101 may provide a credit bureau report. The credit bureau report may include a summary of credit and payment history for an individual. Example data providers of credit bureau reports include Equifax®, Experian® and TransUnion℠.

Data provider 102 may provide a credit score. The credit score may be a single number that represents the credit default risk for an individual, based on the information contained in their credit report. Example data providers of a credit score are CreditXpert and Fair Isaac.

Data provider 103 may provide credit bureau monitoring & notification. The credit bureau monitoring & notification may include daily or weekly monitoring of new inquiries, accounts, or changes to account status or payment history on an individual credit report. Changes usually triggers a consumer notification when detected. Example data providers of credit bureau monitoring and notification include Equifax®, Experian® and TransUnion℠.

Data provider 104 may provide a quarterly credit update. The quarterly credit update may include a summary of changes to an individual's credit report between two points in time. The quarterly credit update may include items that are new, items that have changed, items removed, and items without changes. Example data providers of a quarterly credit bureau update include Equifax®, Experian® and TransUnion℠.

Data provider 105 may provide a service, identity theft expense reimbursement insurance. This may be insurance protecting an individual from the expenses associated with recovering from identity theft. (expenses related to legal work, time off of work, phone, mail, etc.). AIG and Traveler's are example data providers of insurance.

Data provider 106 may provide a direct deposit account (DDA) credit report. This report may include a summary of previous deposit account history for an individual, checking or savings accounts opened, history of any bounced checks, history of any accounts closed by banks for cause (overdraft).

Data provider 107 may provide DDA credit monitoring & notification. DDA credit monitoring & notification may include daily or weekly monitoring of new inquiries, accounts, or changes to account status or check writing history associated with DDA account credit report (checking and savings accounts). This may also involve the monitoring of this information and notification to the consumer when changes or updates detected.

Data provider 108 may provide brokerage account monitoring & notification. The brokerage account monitoring & notification may include daily, or weekly monitoring of brokerage account activity (trades, deposits, withdraws, and transfers) and notification of the account owner when activity is detected. The monitoring feature may be adjusted to only notify a consumer for activity above a certain dollar amount or type of transaction.

Data provider 109 may provide credit card transaction activity monitoring & notification. The credit card transaction activity monitoring & notification may include daily, or weekly monitoring of credit card account activity (payments posted, new authorizations, new charges posted, cash advances) and notification when activity is detected. The monitoring feature may be adjusted to only notify a consumer for activity above a certain dollar amount or type of transaction.

Data provider 110 may provide a public record report. This report may be a summary report of information about an individual from multiple public and private data sources. The information may include addresses, property ownership, criminal records, vehicle registrations, licenses, bankruptcies, etc. An example data provider of public record reports includes LexisNexis.

Data provider 111 may provide public record monitoring & notification. The public record monitoring & notification may include monitoring of an individual's public record report for additions, deletions, and changes. Notification of a consumer may occur when changes are detected in some or all of the data. An example data provider of public record monitoring & notification includes LexisNexis.

Data provider 112 may provide Internet monitoring & notification. Internet monitoring & notification may include Internet search technology deployed to look for instances of a person's social security number or credit card being shared openly on the Internet (web, IRC channels, discussion boards, FTP sites, etc.). A customer may be notified when a match is found in one of the monitored locations. An example data provider of Internet monitoring & notification includes Cyveillance.

Data provider 113 may provide an identity theft risk score. The score may be a composite score or risk level that indicates the likelihood that a person's identity elements (name, address, SSN, telephone, and DOB) have been used fraudulently. The score may be based on detailed analysis of new applications and reported fraud from a network of participating businesses. An example data provider of an identity theft risk score includes ID Analytics.

Data provider 114 may provide a credit card registry. The registry may be a service that allows consumers to register credit cards, so that if they ever have one or more credit cards lost or stolen, a customer service person can help contact all creditors, close accounts, have new cards issued, and initiate an emergency cash advance that can be wired to the consumer. An example data provider of a credit card registry includes Intersections, Inc.

Data provider 115 may provide data backup. The data backup may be an online data storage tool that allows users to archive or store their documents without having to purchase and manage a server.

Data provider 116 may provide background screening. Background screening may include employee/vendor background searches. An example data provider of background screening includes American Background Investigations.

Data provider 117 may provide a business report. The business report may allow businesses to pull credit file for the business. The business report may be combined with data backup and background screening. An example data provider of business reports includes Dunn& Bradstreet.

Data providers that provide other types of information are also contemplated and within the scope of the present invention.

An identity theft engine 120 may receive information from the various data providers. The engine may obtain information from specific data providers or any combination or subcombination thereof. The theft engine 120 obtains data for a particular individual 130. The theft engine 120 may query a data provider for information regarding that particular individual 130. In embodiments of the invention, information from at least two or three of data providers 106-117 may be received and combined, in any combination or subcombination, by the engine. In some embodiments of the invention, information may be received relating a financial account of the user from at least one of data providers 106-109. This data may then be combined with information from at least one of data providers 110-17. Thereafter, a report is prepared based on at least the information received from data providers 106-117. Additional information from data providers 101-105 or from other sources may also be included in the report. In an embodiment, the information received from at least one of data providers 110-112 may be cumulatively use as the user's public information. In a further embodiment of the invention, information regarding a particular individual 130 may be obtained from at least three of data sources 101-117.

The identity theft engine 120 may process the information from the data providers to generate the report. The theft engine 120 may also process the information from the data providers and determine when there is a change in the information. As is described in more detail below with respect to FIG. 2, the theft engine 120 may process the information to produce a report regarding information about the requesting individual 130. A personalized report incorporating information from at least two or three of data providers 106-117, in any combination or subcombination may be created. The report may be provided either online, offline or both, as well as in any suitable format. The combined information from different data providers is presented to the individual 130 in a convenient manner for the individual 130 to review the information and its surround context (identity theft). Viewing the collective information in one place provides a useful tool in detecting patterns, discrepancies and the like that may be utilized to detect or prevent identity theft.

Figure 2:
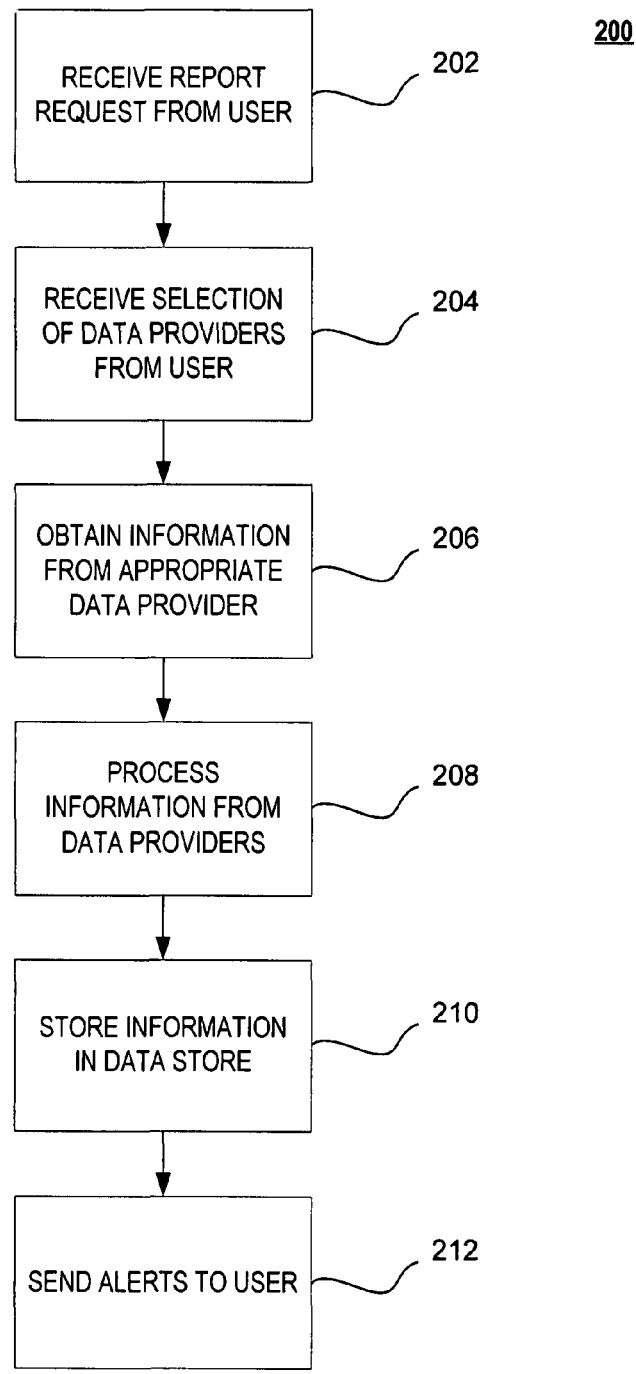
FIG. 2 depicts a process flow according to an exemplary embodiment of the present invention.

FIG. 2 illustrates a process flow 200 according to an exemplary embodiment of the invention. In 202, a report request may be received from a user. A user may interface with the theft engine, for example via a graphical user interface (GUI). The GUI may present the user an option to purchase an identity theft solution. Part of the identity theft solution may be a report including highly sensitive, confidential information regarding an individual. Therefore, the identity of the user should be authenticated. Identity authentication may be part of a registration process. For example, when a user accesses the theft engine, a registration page may be presented. The registration page may be a GUI that requests personal information from the user, such as the user's name, address, social security number, credit card number, etc. The user may need to provide personal information that can be used to set up an account for the user as well as to authenticate the identity of the user. The identity of the user may be verified by a number of known methods, for example using eIDVerifier from Equifax. A user name and password may be created for the user to access the system. Alternatively, the user may access the system and/or be authenticated via other means, for example via telephone, etc.

Once registered and authenticated or logged in, a selection of data providers may be received from the user in 204. The user may purchase the identity theft solution, including a report or alerts containing information from the various data providers. The report may be a pre-selected bundle of types of information, which are gathered from the various independent data providers for each individual, processed by the theft engine and may be presented to the user as a single report. Accordingly, the user may make a single purchase decision, instead of individually obtaining the information from the data providers and/or being required to make numerous purchase decisions. Also, a list of possible information that may be included in the report may be presented to the user. The user may select from the list to create a custom report. In either case, the theft engine may proceed to obtain the requisite information regarding the individual from the data providers in 206. The information may then be processed by the theft engine in 208. After processing the information, the theft engine may store the information in a data storage unit in 210. Finally, the information may be provided to the user in 212. The information provided to the user may take several different forms, examples of which are described in the following paragraphs.

One of the most effective tools in fighting identity theft is early detection. Accordingly, the identity theft engine may provide an alert to the individual when certain information is found. For example, the identity theft engine may monitor the activity surrounding the user's personal information and credit file. Activity on new account applications and address change requests at participating credit, retail and wireless service providers may be monitored. Personal information in public records, such as change of name, phone number or address may be monitored. When suspicious changes to the information are detected, an alert may be sent to the user, for example, via e-mail, text messaging, phone mail, U.S. Mail, etc. The user may then verify the activity and take action if fraud is suspected.

Additionally, an initial report may be created when the user first purchases the identity theft solution. The report may provide a current snapshot of the user's information. Updates to the report may be generated from time to time, for example on a quarterly basis. The quarterly update may include updated reports, plus a summary of all activity reported during the previous quarter.

Figure 3:
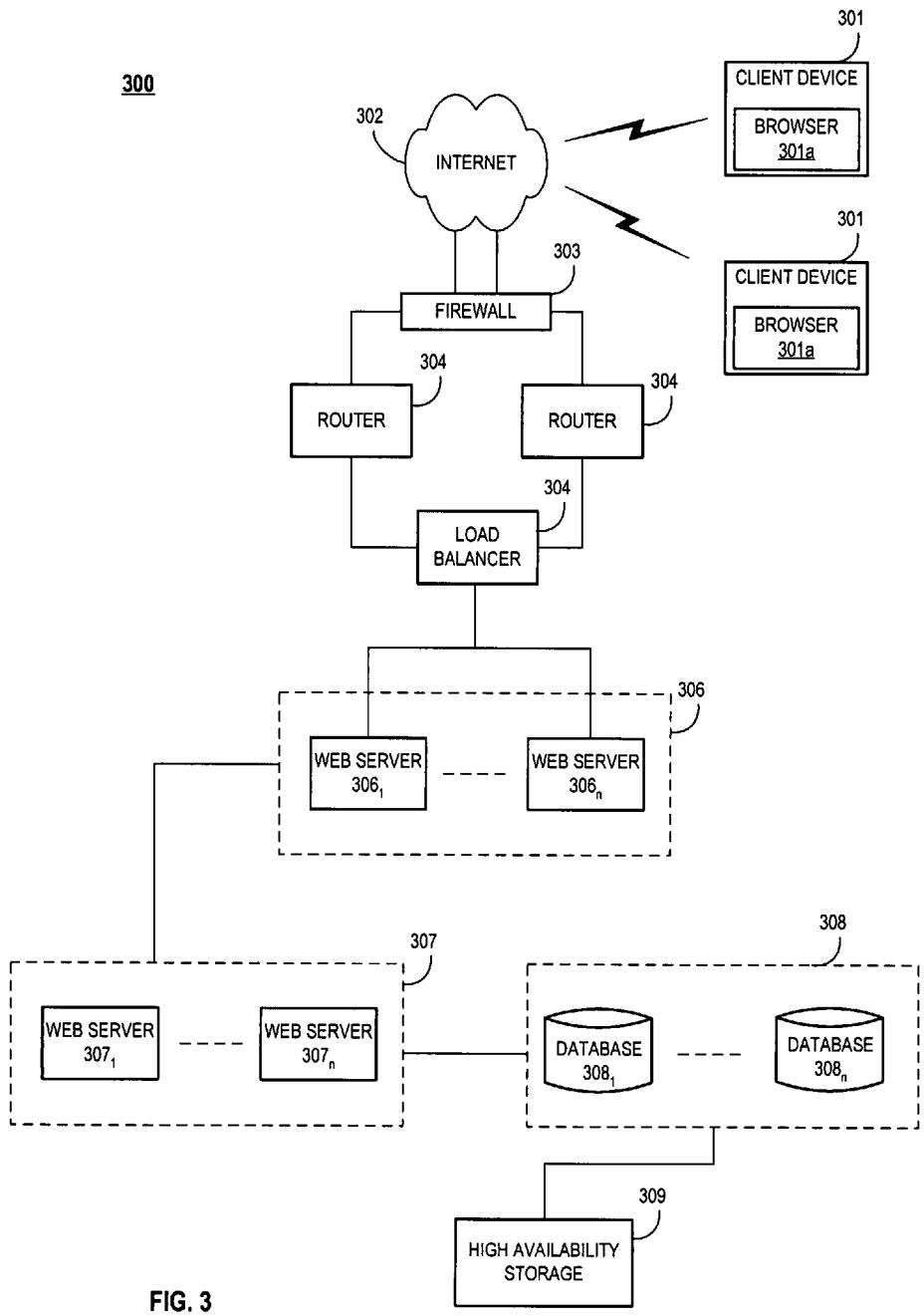
FIG. 3 depicts block diagram of an architecture according to an exemplary embodiment of the present invention.

Turning now to FIG. 3, a schematic diagram of an exemplary system 300 that provides an identity theft solution according to an embodiment the present invention is shown.

System 300 is intended to be accessed by a plurality of clients 301, for example individuals at computers. Such clients 301, in turn, suitably comprise one or more computers and workstations. It should be understood, nevertheless, that other clients 301 such as Web-enabled hand-held devices (e.g., the Palm V™ organizer manufactured by Palm, Inc., Santa Clara, Calif. U.S.A., Windows CE devices, and "smart" phones) which use the wireless access protocol, and Internet appliances fall within the spirit and scope of the present invention.

Clients 301 of all types suitably access system 300 by way of the Internet 302. By use of the term "Internet", it should be understood that the foregoing is not intended to limit the present invention to a network also known as the World Wide Web. For example, it includes intranets, extranets, Virtual Private Networks (VPNs), and the like.

Clients 301 are directed to the service provider's web servers through firewall 303, routers and proxy servers 304 and load balancer 305. Each of the web server $306_1$, $306_2$, . . . $306_n$ is, in turn, preferably comprised of a HP NetServer (manufactured by Hewlett-PackardCorporation). Preferably, each of the web servers $306_1$, $306_2$, . . . $306_n$ further comprises a Microsoft® Windows® NT operating system, and Netscape Enterprise Server (developed by Netscape Communications, a subsidiary of America Online, Inc., Dulles, Va. U.S.A.). Additionally, a capable PKI (Public Key Infrastructure) like Entrust or VeriSign may also be installed on each of the web servers $306_1$, $306_2$, . . . $306_n$ to facilitate core digital certificate storage, issuance, and management services, as well as distribution of certificates and certificate-revocation lists to clients and other servers. Digital certificate management may be privately managed or provided by a third party certificate server. Other forms of certificate servers (e.g., web certificate servers and wireless certificate servers, which are available from VeriSign, Inc., Mountain View, Calif. U.S.A.) may likewise be deployed on each of the web servers $306_1$, $306_2$, . . . $306_n$.

System 100 further comprises a plurality of application servers $307_1$, $307_2$, . . . $307_n$, coupled to and providing support to the web servers $306_1$, $306_2$, . . . $306_n$. Each of the application servers $307_1$, $307_2$, . . . $307_n$ is, like the web servers $306_1$, $306_2$, . . . $306_n$, preferably comprised of a HP NetServer. System 100 further comprises a plurality of databases $308_1$, $308_2$, . . . $308_n$, coupled to the application servers, preferably comprised of HP NetServers using Oracle. In addition to supporting the Web servers the application servers support the verification processing and other back office (batch) processing. High availability storage 309 for the database 308 is also provided and preferably is a Raid 5 Shared Storage.

The identity theft engine may be deployed as software running on the system described above combined with hardware, firmware and the like. Various portions of the software, hardware, and firmware may be distributed on different computers and still achieve the same functionality. A database, such as a data hub may be provided. The data hub may include both proprietary and public databases. The data hub in practice may be a number of different database at various locations. The data hub may be used to verify information as well as to store account information, identity profiles and other information. As data is obtained from the individual and from the data providers and external sources, the data may be added to the appropriate database.

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. For example, the order in which the steps are performed may be varied as long as the above-described dependencies are maintained. It is therefore to be understood that, within the scope of the claims and their equivalents, the invention may be practiced otherwise than as specifically described.

What is claimed is:

1. A computer-implemented method comprising:
providing, to a computing system of an individual, a list of data providers, the list of data providers including one or more financial monitoring data providers, credit monitoring data providers, and public information data providers;
receiving, from the computing system of the individual, a selection of one of the listed financial monitoring data providers;
receiving, from the computing system of the individual, a selection of one of the listed credit monitoring data providers;
receiving, from the computing system of the individual, a selection of one of the listed public information data providers;
receiving, at a server, financial information relating to the individual from the selected financial monitoring data provider;
receiving, at said server, credit information relating to the individual from the selected credit monitoring data provider;
receiving, at said server, public information relating to the individual from the selected public information data provider; and
preparing, by said server, a report relating to a risk of identity theft of the individual based on the received financial information, the received credit information, and the received public information,
wherein the selected financial monitoring data provider is independent from each of the selected credit monitoring data provider and the selected public information data provider,
wherein the selected credit monitoring data provider is independent from the selected public information data provider,
wherein when said public information relating to the individual includes public record information of the individual, said selected public information data provider comprises at least one of a public record report provider that does not provide credit-related information, a public record monitoring and notification provider that does not provide credit-related information, and an internet monitoring and notification provider that does not provide credit-related information,
wherein the public information comprises notifications of additions, deletions, or changes to the public record information of the individual, and
wherein at least one of the notifications of additions, deletions, or changes to the public record information of the individual causes the server to send an alert to the computing system of the individual via a network message, the network message indicating a transaction affecting the individual that requires attention.

2. The method of claim 1, wherein said financial information relating to the individual includes at least one of a direct deposit account (DDA) of the individual, a DDA monitoring of the individual, a brokerage account of the individual, and a monitoring of a credit card of the individual.

3. The method of claim 1,
wherein said credit information relating to the individual includes receiving information relating to a credit report of the individual.

4. The method of claim 3, wherein said information relating to the credit report of the individual includes at least one of a credit score of the individual, a credit monitoring of the individual, and a credit update of the individual.

5. A computer-implemented method comprising:
providing, to a computing system of an individual, a list of data providers, the list of data providers including one or more financial monitoring data providers, credit monitoring data providers, and public information data providers;
receiving, from the computing system of the individual, a selection of one of the listed financial monitoring data providers;
receiving, from the computing system of the individual, a selection of one of the listed credit monitoring data providers;
receiving, from the computing system of the individual, a selection of one of the listed public information data providers;
receiving, at a server, financial information relating to the individual from the selected financial monitoring data provider, the financial information relating to the individual relating to at least one of a direct deposit account (DDA) account credit report, a DDA account credit monitoring and notification report, a brokerage account monitoring and notification report, and a credit card transaction activity;
receiving, at the server, credit information relating to the individual from the selected credit monitoring data provider;
receiving, at said server, public information relating to the individual from the selected public information data provider, the public information relating to the individual relating to at least one of a public record report, a public record monitoring and notification report, an internet monitoring and notification report, or a business report;
preparing, by said server, a report relating to a risk of identity theft of the individual based on the received financial information, the received credit information, and the received public information;
monitoring at least one of the selected financial monitoring data provider, the selected credit monitoring data provider, and the selected public information data provider on a periodic basis for changes in information relating to the individual; and sending an alert to the computing system of the individual via a message sent over a network connecting the server and the computing system of the individual when a change in public information of the individual is detected by the server based on the public information relating to the individual received from the selected public information data provider, wherein the alert is sent via at least one of email, telephone, text message, regular mail, and facsimile, wherein the selected financial monitoring data provider is independent from each of the selected credit monitoring data provider and the selected public information data provider, and wherein the selected credit monitoring data provider is independent from the selected public information data provider.

6. The method of claim 1, further comprising:

requesting said received financial information relating to the individual from said selected financial information data provider;

requesting said received credit information from said selected credit monitoring data provider; and requesting said received public information from said selected public information data provider.

7. The method of claim 1, further comprising processing the received financial information, the received credit information, and the received public information to identify irregularities relating to identity theft.

8. The method of claim 1, further comprising monitoring at least one of the selected financial monitoring data provider, the selected credit monitoring data provider, and the selected public information data provider on a periodic basis for changes in information relating to the individual.

9. The method of claim 8, further comprising sending an alert to the computing system of the individual via a message sent over a network connecting the server and the computing system of the individual when a change in public information of the individual is detected by the server based on the public information relating to the individual received from the selected public information data provider.

10. The method of claim 9, wherein the alert is sent to the user via at least one of email, telephone, text message, regular mail, and facsimile.

11. The method of claim 5, wherein said credit information relating to the individual includes at least one of a credit report of the individual, a credit score of the individual, a credit monitoring of the individual, and a credit update of the individual.

12. A system for detecting identity theft comprising:

at least one financial monitoring data provider configured to provide information regarding a financial account of an individual, said financial monitoring data provider comprising at least one of a direct deposit account (DDA) account credit report, a DDA account credit monitoring & notification, a brokerage account monitoring and notification, and a credit card transaction activity monitoring & notification;

at least one credit monitoring data provider configured to provide information regarding credit information relating to the individual;

at least one public information data provider configured to provide public information relating to the individual, said public data provider comprising at least one of a public record report provider, a public record monitoring & notification provider, an internet monitoring or notification provider, or a business report provider; and a server with a processor, the server being further configured to:

provide, to a computing system of an individual, a list of data providers, the list of data providers including one or more financial monitoring data providers, credit monitoring data providers, and public information data providers;

receive, from the computing system of the individual, a selection of one of the listed financial monitoring data providers;

receive, from the computing system of the individual, a selection of one of the listed credit monitoring data providers;

receive, from the computing system of the individual, a selection of one of the listed public information data providers;

receive, at the server, financial information relating to the individual from the selected financial monitoring data provider;

receive, at said server, credit information relating to the individual from the selected credit monitoring data provider;

receive, at said server, public information relating to the individual from the selected public information data provider;

monitor, by the server, at least one of the selected financial monitoring data provider, the selected credit monitoring data provider, and the selected public information data provider, and prepare, by the server, a report relating to a risk of identity theft of the individual, wherein the selected financial monitoring data provider is independent from each of the selected credit monitoring data provider and the selected public information data provider, wherein the selected credit monitoring data provider is independent from the selected public information data provider, and wherein the credit monitoring data provider comprises at least one of a credit report provider, a credit score provider, a credit monitoring provider, and a credit update provider.

13. A system for detecting identity theft comprising:

a server with a processor, the server being further configured to provide to a computing system of an individual a list of data providers, the list of data providers including one or more financial monitoring data providers, credit monitoring data providers, and public information data providers;

an input configured to receive from the computing system of the individual a selection designating one of the listed financial monitoring data providers, a selection designating one of the listed credit monitoring data providers, and a selection designating one of the listed public information data providers;

an input configured receive financial information relating to the individual from the selected financial monitoring data provider, configured receive credit information relating to the individual from the selected credit monitoring data provider, and configured receive public information relating to the individual from the selected public information data provider, wherein the financial information pertains to at least one of a direct deposit account (DDA) account credit report, a DDA account credit monitoring and notification report, a brokerage account monitoring and notification report, and a credit card transaction activity, wherein the public information pertains to at least one of a public record report, a public record monitoring and notification report, an internet monitoring and notification report, or a business report;

a processor configured to determine from the received financial information, the received credit information, and the received public information a report pertaining to a risk of theft of an identity of the individual; and a storage configured to store the determination of the risk of theft of the identity of the individual, the risk of theft determination being accessible by the individual, wherein the public information comprises notifications of additions, deletions, or changes to the public record information of the individual, and wherein at least one of the notifications of additions, deletions, or changes to the public record information of the individual causes the server to send an alert to the computing system of the individual via a network message, the network message indicating a transaction affecting the individual that requires attention.

14. A non-transitory computer readable medium having computer-implemented instructions stored thereon, the instructions for detecting identity theft, which, when executed, performs a method comprising:

providing, to a computing system of an individual, a list of data providers, the list of data providers including one or more financial monitoring data providers, credit monitoring data providers, and public information data providers;

receiving, from the computing system of the individual, a selection of one of the listed financial monitoring data providers;

receiving, from the computing system of the individual, a selection of one of the listed credit monitoring data providers;

receiving, from the computer system of the individual, a selection of one of the listed public information data providers;

receiving, at a server, financial information relating to the individual from the selected financial monitoring data provider;

receiving, at said server, credit information relating to the individual from the selected credit monitoring data provider;

receiving, at said server, public information relating to the individual from the selected public information data provider; and preparing, by said server, a report relating to a risk of identity theft of the individual based on the received financial information, the received credit information, and the received public information, wherein the selected financial monitoring data provider is independent from each of the selected credit monitoring data provider and the selected public information data provider, wherein the selected credit monitoring data provider is independent from the selected public information data provider, wherein when said public information includes public record information of the individual, said public information data provider comprises at least one of a public record report provider that does not provide credit-related information, a public record monitoring and notification provider that does not provide credit-related information, and an internet monitoring and notification provider that does not provide credit-related information, wherein the public information comprises notifications of additions, deletions, or changes to the public record information of the individual, and wherein at least one of the notifications of additions, deletions, or changes to the public record information of the individual causes the server to send an alert to the computing system of the individual via a network message, the network message indicating a transaction affecting the individual that requires attention.

15. The non-transitory computer readable medium of claim 14, wherein said financial information includes at least one of a direct deposit account (DDA) of the individual, a DDA monitoring of the individual, a brokerage account of the individual, and a monitoring of a credit card of the individual.

* * * * *

UNITED STATES PATENT AND TRADEMARK OFFICE
CERTIFICATE OF CORRECTION

Page 1 of 1

PATENT NO. : 9,996,880 B2
APPLICATION NO. : 11/711836
DATED : June 12, 2018
INVENTOR(S) : Andringa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1493 days.

Signed and Sealed this
Ninth Day of July, 2019

Andrei Iancu
*Director of the United States Patent and Trademark Office*